(12) United States Patent
Hashemi et al.

(10) Patent No.: US 11,946,515 B1
(45) Date of Patent: Apr. 2, 2024

(54) REAL-TIME MACHINE LEARNING AND PHYSICS-BASED HYBRID APPROACH TO PERFORM eLSD TORQUE ESTIMATION

(71) Applicant: GM Global Technology Operations LLC, Detroit, MI (US)

(72) Inventors: Arash Hashemi, Waterloo (CA); Sresht Gurumoorthi Annadevara, Toronto (CA); Naser Mehrabi, Richmond Hill (CA); SeyedAlireza Kasaiezadeh Mahabadi, Novi, MI (US); Lapo Frascati, Dicomano (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/469,009

(22) Filed: Sep. 18, 2023

(51) Int. Cl.
*F16D 48/06* (2006.01)
*F16H 48/34* (2012.01)
*F16H 48/20* (2012.01)

(52) U.S. Cl.
CPC .............. *F16D 48/06* (2013.01); *F16H 48/34* (2013.01); *F16D 2500/10425* (2013.01); *F16D 2500/3115* (2013.01); *F16D 2500/3117* (2013.01); *F16D 2500/70647* (2013.01); *F16D 2500/70668* (2013.01); *F16H 2048/204* (2013.01)

(58) Field of Classification Search
CPC ........... F16D 48/06; F16D 2500/10425; F16D 2500/3115; F16D 2500/3117; F16D 2500/70647; F16D 2500/70668; F16H 48/34; F16H 2048/204
See application file for complete search history.

(56) References Cited

U.S. PATENT DOCUMENTS 11,209,054 B1 * 12/2021 Zhang .................. F16D 48/066
2010/0209883 A1 * 8/2010 Chin .................... G09B 19/167
434/65

FOREIGN PATENT DOCUMENTS

DE 102018115426 A1 * 1/2020
DE 102020212195 A1 * 3/2022

* cited by examiner

Primary Examiner — Edwin A Young
(74) Attorney, Agent, or Firm — Vivacqua Crane PLLC

(57) ABSTRACT

A method for determining, in real-time, an electronic limited-slip differential (eLSD) clutch torque includes receiving vehicle data in real-time, wherein the vehicle data includes a torque request, determining a preliminary eLSD clutch torque using a neural network and the vehicle data, determining clutch torque bounds of the eLSD using a physics-based model, determining whether the preliminary eLSD clutch torque is outside the clutch torque bounds of the eLSD, adjusting the preliminary eLSD clutch torque using clutch torque bounds to determine a final clutch torque of the eLSD in response to determining that the preliminary eLSD clutch torque is outside the clutch torque bounds of the eLSD, and commanding, in real-time, the eLSD to apply the final clutch torque to a clutch of the eLSD.

20 Claims, 2 Drawing Sheets

REAL-TIME MACHINE LEARNING AND PHYSICS-BASED HYBRID APPROACH TO PERFORM eLSD TORQUE ESTIMATION

INTRODUCTION

The present disclosure relates to a real-time machine learning and physics-based hybrid approach to estimate eLSD clutch torque.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Electronic limited slip differential (eLSD) systems include a clutch. Some eLSD systems use a physics-based clutch torque estimation algorithm to estimate clutch torque. Physics-based clutch torque estimation algorithms, however, are not always accurate when the eLSD system is in the locked condition due to inherent limitations of the physics-based model. Particularly, the physics-based model makes certain assumptions, such as the vehicle being on a high coefficient of friction surface and not experiencing split coefficient of friction conditions, which can result in incorrect estimations in other conditions. These inaccuracies can cause confusion for the eLSD controller and lead to incorrect actions being taken. As a result, it is desirable to take into consideration the limitations of the physics-based model used in the clutch torque estimation algorithm for the locked condition and to employ other methods to improve the accuracy of the estimation.

SUMMARY

The present disclosure also describes a vehicle including sensors, a steer-by-wire system, and a controller in communication with the sensors and the steer-by-wire system. The controller is programmed to execute the method described above. The present disclosure also describes a tangible, non-transitory, machine-readable medium, comprising machine-readable instructions, that when executed by a processor, cause the processor to execute the method described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
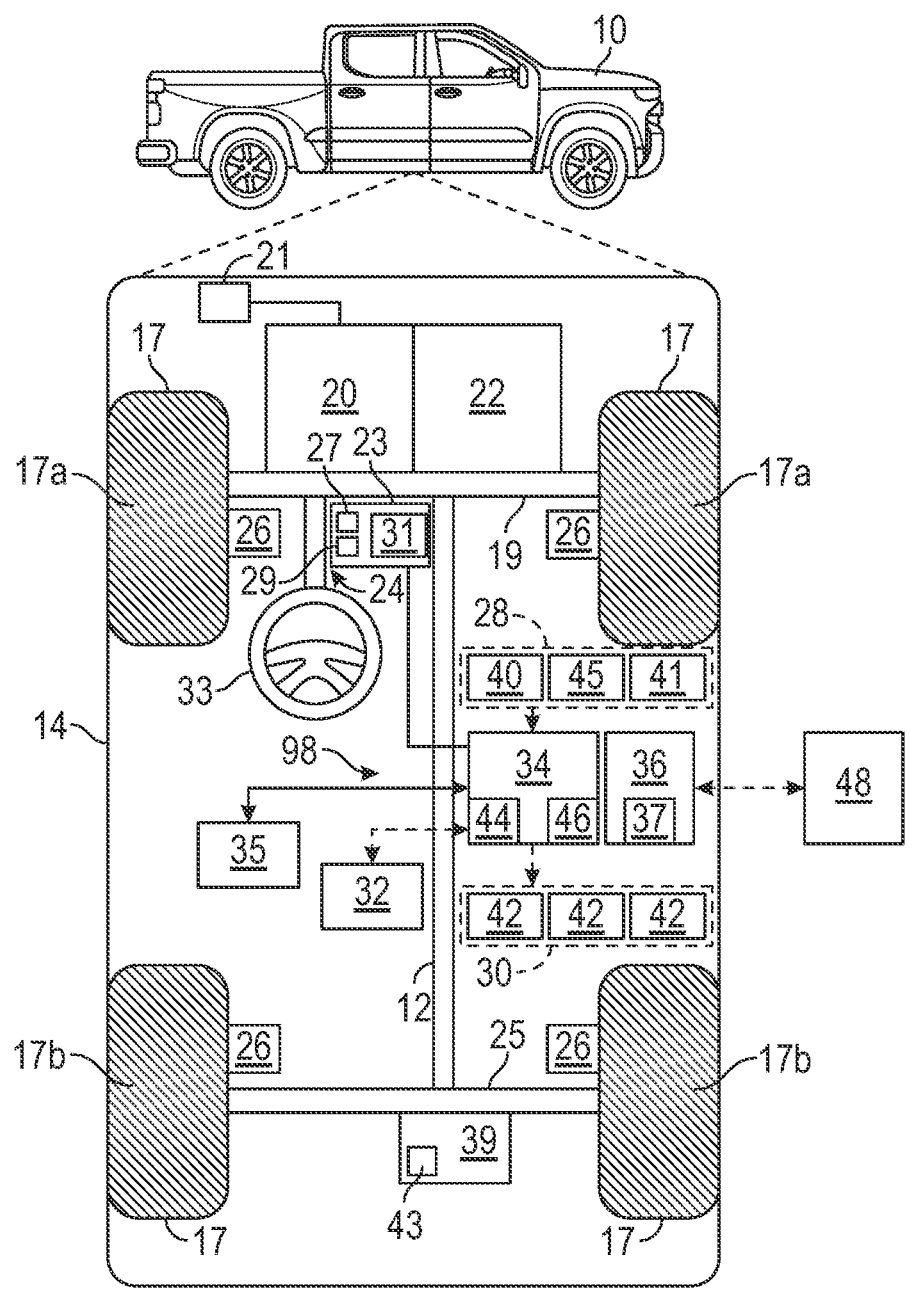
FIG. 1 is a block diagram depicting an embodiment of a vehicle including an eLSD.

Reference will now be made in detail to several examples of the disclosure that are illustrated in accompanying drawings. Whenever possible, the same or similar reference numerals are used in the drawings and the description to refer to the same or like parts or steps.

With reference to FIG. 1, a vehicle 10 generally includes a chassis 12, a body 14, front and rear wheels 17 and may be referred to as a vehicle system. In the depicted embodiment, the vehicle 10 includes two front wheels 17a and two rear wheels 17b. The body 14 is arranged on the chassis 12 and substantially encloses components of the vehicle 10. The body 14 and the chassis 12 may jointly form a frame. The wheels 17 are each rotationally coupled to the chassis 12 near a respective corner of the body 14. The vehicle 10 includes a front axle 19 coupled to the front wheels 17a and a rear axle 25 coupled to the rear wheels 17b.

The vehicle 10 is an autonomous vehicle, and a control system 98 is incorporated into the vehicle 10. The system 98 may be referred to as the system. The vehicle 10 is, for example, a vehicle that is automatically controlled to carry passengers from one location to another. The vehicle 10 is depicted in the illustrated embodiment as a pickup truck, but it should be appreciated that other vehicles including, trucks, sedans, coupes, sport utility vehicles (SUVs), recreational vehicles (RVs), etc., may also be used. In an embodiment, the vehicle 10 may include a so-called a Level Two, a Level Three, Level Four, or Level Five driving automation system. A Level Four system indicates "high automation," referring to the driving mode-specific performance by an automated driving system of aspects of the dynamic driving task, even if a human driver does not respond appropriately to a request to intervene. A Level Five system indicates "full automation," referring to the full-time performance by an automated driving system of aspects of the dynamic driving task under a number of roadway and environmental conditions that can be managed by a human driver. In Level 3 vehicles, the system 98 performs the entire dynamic driving task (DDT) within the area that it is designed to do so. In Level 2 vehicles, systems provide steering, brake/acceleration support, lane centering, and adaptive cruise control. However, even if these systems are activated, the vehicle operator at the wheel must be driving and constantly supervising the automated features.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The steering system 24 is a steer-by-wire system. The propulsion system 20 may, in various embodiments, include an electric machine such as a traction motor and/or a fuel cell propulsion system. The vehicle 10 may further include a battery (or battery pack) 21 electrically connected to the propulsion system 20. Accordingly, the battery 21 is configured to store electrical energy and to provide electrical energy to the propulsion system 20. In certain embodiments, the propulsion system 20 may include an internal combustion engine. The transmission system 22 is configured to transmit power from the propulsion system 20 to the vehicle wheels 17 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 17. The brake system 26 may, in various embodiments, include friction brakes, brake by wire, a regenerative braking system such as an electric machine, and/or other appropriate braking systems. The steering system 24 influences the position of the vehicle wheels 17 and may include a steering wheel 33. While depicted as including a steering wheel 33 for illustrative purposes, in some embodiments contemplated within the scope of the present disclosure, the steering system 24 may not include a steering wheel 33.

The sensor system 28 includes one or more sensors 40 (i.e., sensing devices) that sense observable conditions of the exterior environment and/or the interior environment of the vehicle 10. The sensors 40 are in communication with the controller 34 and may include, but are not limited to, one or more steering wheel sensors 45, one or more radars, one or more light detection and ranging (lidar) sensors, one or more proximity sensors, one or more odometers, one or more ground penetrating radar (GPR) sensors, one or more steering angle sensors, Global Navigation Satellite System (GNSS) transceivers (e.g., one or more global positioning systems (GPS) transceivers), one or more tire pressure sensors, one or more cameras 41 (e.g., eye tracker), one or more gyroscopes, one or more accelerometers, one or more inclinometers, one or more speed sensors, one or more ultrasonic sensors, one or more inertial measurement units (IMUs), one or more night-vision devices, thermal imaging sensors, and/or other sensors. Each sensor 40 is configured to generate a signal that is indicative of the sensed observable conditions of the exterior environment and/or the interior environment of the vehicle 10. Because the sensor system 28 provides data to the controller 34, the sensor system 28 and its sensors 40 are considered sources of information (or simply sources).

The actuator system 30 includes one or more actuator 42 that control one or more vehicle features such as, but not limited to, the propulsion system 20, the transmission system 22, the steering system 24, and the brake system 26. In various embodiments, the vehicle features may further include interior and/or exterior vehicle features such as, but are not limited to, doors, a trunk, and cabin features such as air, music, lighting, etc. The actuators 42 may be part of the steering system 24 and include one or more road wheel actuators (RWAs) and a hand wheel actuator (HWA).

The data storage device 32 stores data for use in automatically controlling the vehicle 10. In various embodiments, the data storage device 32 stores defined maps of the navigable environment. In various embodiments, the defined maps may be predefined by and obtained from a remote system. For example, the defined maps may be assembled by the remote system and communicated to the vehicle 10 (wirelessly and/or in a wired manner) and stored in the data storage device 32. The data storage device 32 may be part of the controller 34, separate from the controller 34, or part of the controller 34 and part of a separate system.

The vehicle 10 may further include one or more airbags 35 in communication with the controller 34 or another controller of the vehicle 10. The airbag 35 includes an inflatable bladder and is configured to transition between a stowed configuration and a deployed configuration to cushion the effects of an external force applied to the vehicle 10. The sensors 40 may include an airbag sensor, such as an IMU, configured to detect an external force and generate a signal indicative of the magnitude of such external force. The controller 34 is configured to command the airbag 35 to deploy based on the signal from one or more sensors 40, such as the airbag sensor. Accordingly, the controller 34 is configured to determine when the airbag 35 has been deployed.

The controller 34 includes at least one processor 44 and a non-transitory computer readable storage device or media 46. The processor 44 may be a custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the vehicle 10. The controller 34 of the vehicle 10 may be referred to as a vehicle controller and may be programmed to execute a method 100 (FIG. 2) as described in detail below.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although a single controller 34 is shown in FIG. 1, embodiments of the vehicle 10 may include a plurality of controllers 34 that communicate over a suitable communication medium or a combination of communication mediums and that cooperate to process the sensor signals, perform logic, calculations, methods, and/or algorithms, and generate control signals to automatically control features of the vehicle 10. In various embodiments, one or more instructions of the controller 34 are embodied in the control system 98.

The vehicle 10 includes a user interface 23, which may be a touchscreen in the dashboard. The user interface 23 may include, but is not limited to, an alarm, such as one or more speakers 27 to provide an audible sound, haptic feedback in a vehicle seat or other object, one or more displays 29, one or more microphones 31 and/or other devices suitable to provide a notification to the vehicle user of the vehicle 10. The user interface 23 is in electronic communication with the controller 34 and is configured to receive inputs by a vehicle occupant 11 (e.g., a vehicle driver or a vehicle passenger). For example, the user interface 23 may include a touch screen and/or buttons configured to receive inputs from a vehicle occupant 11. Accordingly, the controller 34 is configured to receive inputs from the user via the user interface 23. The vehicle 10 may include one or more displays 29 configured to display information to the vehicle occupant 11 (e.g., vehicle operator or passenger) and may be a head-up display (HUD).

The communication system 36 is in communication with the controller 34 and is configured to wirelessly communicate information to and from other remote vehicles 48, such as but not limited to, other vehicles ("V2V" communication), infrastructure ("V2I" communication), remote systems at a remote call center (e.g., ON-STAR by GENERAL MOTORS) and/or personal electronic devices, such as a mobile phone. In the present disclosure, the term "remote vehicle" means a vehicle, such as a car, configured to transmit one or more signals to the vehicle 10 while not physically connected to the vehicle 10. In certain embodiments, the communication system 36 is a wireless communication system configured to communicate via a wireless local area network (WLAN) using IEEE 802.11 standards or by using cellular data communication. However, additional, or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication system 36 may include one or more antennas and/or communication transceivers 37 for receiving and/or transmitting signals, such as cooperative sensing messages (CSMs). The communication transceivers 37 may be considered sensors 40. The communication system 36 is configured to wirelessly communicate information between the vehicle 10 and another vehicle. Further, the communication system 36 is configured to wirelessly communicate information between the vehicle 10 and infrastructure or other vehicles.

The vehicle 10 includes one or more electronically-controlled limited slip differentials (eLSD) 39. The eLSD 39 includes a slip control algorithm that provides controlled variable coupling of the vehicle's driving torque to two or more of the vehicle wheels through the use of an electrically actuated clutch 43. Under normal driving conditions, the eLSD 39 functions as open differentials that evenly distribute torque to the wheel shafts. When a loss of traction is sensed at one output of the differential, however, the clutch 43 of the eLSD 39 can be activated via a feedback control loop to maintain a speed difference between the differential outputs that would result as if the wheels were rotating at their natural speeds, thereby improving the stability and comfort of the vehicle 10.

Figure 2:
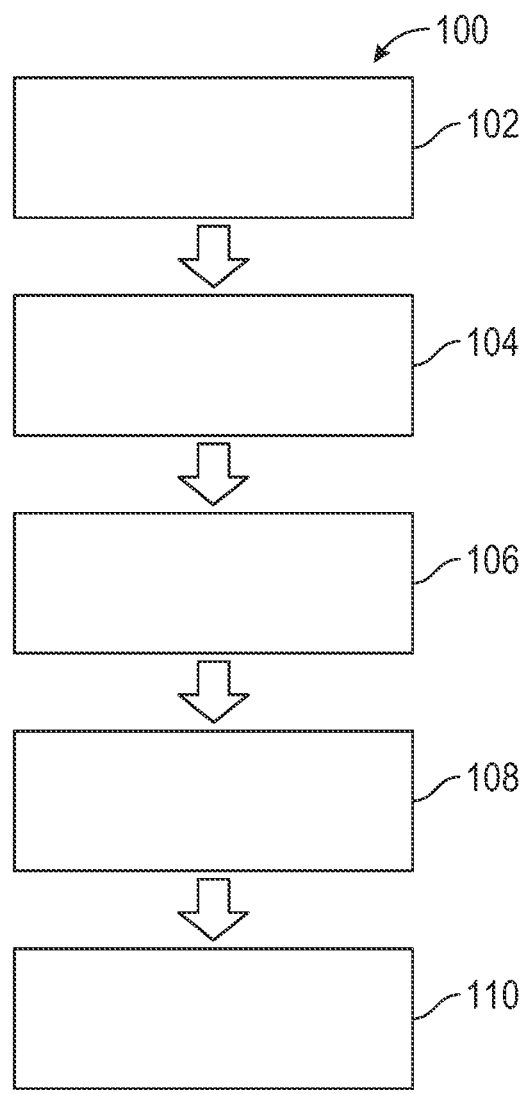
FIG. 2 is a flowchart of a method for estimating the clutch torque of the eLSD of the vehicle.

FIG. 2 is a flowchart of a method 100 for determining, in real-time, an electronic limited-slip differential (eLSD) clutch torque. The method 100 begins at block 102. Block 102 entails developing a physics-based model for estimating the clutch torque of the eLSD 39 both when the eLSD 39 is locked and when the eLSD is unlocked. However, the physics-based clutch torque estimation for the unlocked state is more reliable than the physics-based clutch torque estimation for the locked state. For the unlocked state of the eLSD 39, the clutch torque is a function of the requested torque, the speed differences between the wheels 17, and the clutch torque capacity. For the unlocked state of the eLSD 39, the controller 34 may use the following equations to estimate the clutch torque of the eLSD 39:

$$T_{c\_act} = \frac{1}{\tau_c s + 1} p_1 \tanh(p_2 * (d\omega)^{p_3}) T_{c\_rqst}$$

where:
$T_{c\_acct}$ is the clutch torque of the eLSD 39 in the unlocked state;
$T_{c\_rqst}$ is the requested torque;
$T_c$ is the model time constant;
s is Laplace domain;
$p_1$ is a first model coefficient;
$p_2$ is a second model coefficient;
(dω) is the speed differences between the rear wheels; and
p3 is a third model coefficient.

When the clutch 43 of the eLSD 39, the wheel speeds are the same For the locked state of the eLSD 39, the controller 34 may use the following equations to estimate the clutch torque of the eLSD 39:

$$R_{eff,r}F_{xrl} + R_{eff,r}F_{xrr} = T_{r\_act} - I_{wr} - I_{wr}\dot{\omega}_{rr}$$

$$T_{c\_act} = R_{eff,r}(F_{xrl} - F_{xrr})$$

where:
$R_{eff,r}$ is the rear tire effective rolling radius;
$F_{xrl}$ is the rear left wheel traction force;
$T_{r\_act}$ is the rear engine actuation;
$I_{wr}$ is the rear right wheel moment of inertia; and
$\dot{\omega}_{rr}$ is the rear right wheel angular acceleration.

When both wheels 17 are within the linear region, the following equations may be used:

$$\frac{F_{xrl}}{\mu_{rl}F_{zrl}} - \frac{F_{xrr}}{\mu_{rr}F_{zrr}} = K_{norm} * \Delta\kappa$$

$$\Delta\kappa = \frac{l_w r}{R_{eff,r}\omega_{rr}}$$

$T_{c\_act}$ is the clutch actuation;
$F_{xrr}$ is the rear right wheel traction force;
$\mu_{rl}$ is the rear left wheel friction coefficient;
$F_{zrl}$ is the rear left wheel normal force;
$\mu_{rr}$ is the rear right wheel friction coefficient;
$F_{zrr}$ is the rear right wheel normal force;
$F_{xrl}$ is the rear left wheel traction force;
$K_{norm}$ is the longitudinal tire stiffness normalized by normal force;
$l_w$ is the wheel base of the vehicle 10;
r is the yaw rate of the vehicle 10;
$R_{eff,r}$ is the rear tire effective rolling radius; and
$\omega_{rr}$ is the rear right wheel angular velocity.

When both wheels 17 are within the nonlinear region, the following equations may be used:

$$\frac{F_{xrl}}{F_{xrr}} = \frac{\mu_{rl}F_{zrl}}{\mu_{rr}F_{zrr}}$$

where:
$F_{xrl}$ is the rear left traction force;
$F_{xrr}$ is the rear right traction force;
$\mu_{rl}$ is the rear left friction coefficient;
$\mu_{rr}$ is the rear right friction coefficient;
$F_{zrl}$ is the rear left normal force; and
$F_{zrr}$ is the rear right normal force.

When one wheel 17 is in a linear region, the following equations may be used:

$$\frac{F_{xrl}}{\mu_{rl}F_{zrl}} - \frac{F_{xrr}}{\mu_{rr}F_{zrr}} = 1 - K_{norm} * \kappa_{rr}$$

where:
$F_{xrl}$ is the rear left traction force;
$F_{xrr}$ is the rear right traction force;
$\mu_{rl}$ is the rear left friction coefficient;
$\mu_{rr}$ is the rear right friction coefficient;
$F_{zrl}$ is the rear left normal force; and
$F_{zrr}$ is the rear right normal force.

After executing block 102, the method 100 proceeds to block 104. Block 104 entails analyzing vehicle data to understand which signals may be useful to predict the clutch torque of the eLSD 39. Certain input features (i.e., vehicle data) are selected for offline training. In order to reduce the neural network complexity, different combinations of possible features were chosen to train the neural network. A final set of input features were then selected based on the following criteria: (a) performance of the neural network (i.e., the features that lead to the most accurate eLSD clutch torque estimation were chosen); and (b) the ease of implementation is production model (i.e., input features that are more difficult to implement in the production model are not chosen as inputs of the neural network). After analyzing the vehicle data, the neural network solely needs the following inputs for offline training and later real-time execution, namely: the torque clutch capacity of the eLSD 39, the rotational speed of a left, rear wheel of the vehicle 10, the rotational speed of the right, rear wheel 17 of the vehicle 10, the axle torque of the vehicle 10, the longitudinal velocity of the vehicle 10, the yaw rate of the vehicle 10, the normal force of the left, rear wheel 17 of the vehicle 10, and the normal force of the right, rear wheel 17 of the vehicle 10. Then, the method 100 proceeds to block 106.

At block 106, the neural network model for eLSD clutch torque estimation is developed using the previously discussed inputs. The neural network structure may be based on the complexity of the data and the physical phenomena. The features (i.e., neural network inputs) significantly affect the output (i.e., the eLSD clutch torque estimation). At block 106, the proper neural network type is evaluated and selected (e.g., feedforward, feedback, etc.). At block 106, the neural network size and complexity is determined. Specifically, the minimum number of layers and neurons that can represent the data is selected. As a non-limiting example, the neural network may include two hidden layers and a switch activation function. Each layer may have thirteen neurons. After developing the neural network, the neural network may be trained offline. As a non-limiting example, two hundred twenty-five sets of vehicle data may be used to train the neural network. The vehicle data may be collected in many different driving scenarios while the vehicle 10 operates on surface friction coefficients ranging from zero to one. The training data may be divided into training data, validation data, and testing data with five-fold cross validation data. Because the accuracy of the sign is significant for eLSD control, the cost function for training the neural network was adapted to have the sign of the clutch torque included in it. The cost function of the neural network may be expressed as follows:

$$W\|T_C - \hat{T}_C\|^2 + \left\|\text{sign}(T_C) - \tanh\left(\frac{\hat{T}_C}{100}\right)\right\|^2$$

where:
W is the cost function weight;
$T_c$ is the network output clutch torque; and
$\hat{T}_c$ is the ground truth clutch torque.

The neural network therefore uses the vehicle data as inputs and outputs a preliminary eLSD clutch torque. Then, the method 100 continues to block 108.

At block 108, a constraint model (i.e., clutch torque bounds) is employed to limit the estimation of clutch torque during the unlocked state to a physics-based model and during the locked state to a data-driven approach, with a seamless transition between the two. To ensure that the clutch torque estimation does not have any erratic behavior if the neural network is exposed to information that it has never analyzed before, a constrain logic is used. The constraint logic differs based on whether the eLSD 39 is in a locked or an unlocked state. When the eLSD 39 is in the unlocked state, the neural network is constrained by unlocked physics-based estimation, which may be expressed by the following equation:

Max=$Tc$+margin

Min=$Tc$−margin where:
$T_c$ is the clutch torque capacity;
margin is a predetermined marginal value;
Max is a maximum bound; and
Min is a minimum bound.

When the eLSD 39 is in the locked state, the locked physics=based estimation is use to constrain the output of the neural network. The physics-based model calculates the maximum and maximum possible eLSD clutch torque using the following equations:

$$T_{cest\_max\_final} = R_{eff}(F_{zr}+F_{zl})$$

$$T_{cest\_min\_final} = -R_{eff}(F_{zr}+F_{zl})$$

$$\text{Max}=\text{Min}(T_{cest\_max}, T_c)$$

$$\text{Min}=\text{Max}(T_{cest\_max}, T_c)$$

where:
$R_{eff}$ is the tire effective rolling radius;
$F_{zl}$ is the rear left wheel normal force;
$F_{zr}$ is the rear right wheel normal force;
Max is a maximum bound; and
Min is a minimum bound;
$T_c$ is the clutch torque capacity;
$T_{cest\_max}$ is a maximum torque factor; and
$T_{cest\_min}$ final is a minimum torque factor.

Therefore, the minimum and maximum bounds of the clutch torque bounds are each a function of the torque clutch capacity of the clutch 43 of the eLSD 39. Next, the controller 34 determines whether the preliminary eLSD clutch torque determined using the neural network is outside the clutch torque bonds of the eLSD. If the preliminary eLSD clutch torque determined by the neural network is outside the clutch torque bounds, then the controller 34 adjusts the preliminary eLSD clutch torque using clutch torque bounds to determine a constrained clutch torque of the eLSD and eventually the final clutch torque of the eLSD 39. For example, if the preliminary eLSD clutch torque is greater than the maximum bound, then the constrained eLSD clutch torque is set to be the maximum bound. If the preliminary eLSD clutch torque is less than the minimum bound, then the constrained eLSD clutch torque is set to be the minimum bound. If the preliminary eLSD clutch torque is within the clutch, then no adjustment is necessary. Then, the method 100 proceeds to block 110.

At block 110, a digital low-pass filter is used to ensure that the final signal sent to the eLSD control algorithm does not contain a significant amount of noise. The digital lo-pass filter coefficient chosen must be done so in a way to reduce sufficient amount of noise but also not cause a lot of lag to the estimation. Optimization using algorithms such as pattern search have shown to yield the best results for calculating the filter coefficients. Additionally, there may be discontinuities in the clutch torque estimation signal between the unlocked and locked constraint schemes. The eLSD 39 is in a transitioning state when the eLSD is switching between the locked state and the unlocked state. When the eLSD switches between locked and unlocked states, heavy filtration is added for a calibratable period of time. The controller 34 therefore determines whether the eLSD 39 is in the transitioning state. If the eLSD 39 is in the transitioning state, then the controller 34 sets the time constant of the digital low-pass filter to have a first predetermined value. If the LSD 39 is not in the transitioning state, then the controller 34 sets the time constant of the digital low-pass filter to have a second predetermined value. The first predetermined value is greater than the second predetermined value to filter out the discontinuities in the clutch torque estimation signal when the eLSD 39 is in the transitioning state. The digital low-pass filter then outputs the final clutch torque of the eLSD 39. Then, the controller 34 may command, in real-time, the vehicle 10 to perform a control action by taking into consideration the final clutch torque of the eLSD 39. For instance, the controller 34 may command, in real-time, the eLSD 39 to apply the final clutch torque to the clutch 43 of the eLSD 49.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for determining, in real-time, an electronic limited-slip differential (eLSD) clutch torque, comprising:
    receiving vehicle data in real-time, wherein the vehicle data includes a torque request;
    determining a preliminary eLSD clutch torque using a neural network and the vehicle data;
    determining clutch torque bounds of the eLSD using a physics-based model;
    determining whether the preliminary eLSD clutch torque is outside the clutch torque bounds of the eLSD;
    in response to determining that the preliminary eLSD clutch torque is outside the clutch torque bounds of the eLSD, adjusting the preliminary eLSD clutch torque using the clutch torque bounds to determine a final clutch torque of the eLSD; and
    commanding, in real-time, the eLSD to apply the final clutch torque to a clutch of the eLSD.

2. The method of claim 1, further comprising filtering the final clutch torque using a digital filter, wherein the digital filter has a time constant.

3. The method of claim 2, further comprising:
    determining whether the eLSD is in a transitioning state, wherein the eLSD is in the transitioning state when the eLSD is switching between a locked state and an unlocked state; and in response to determining that the eLSD is in the transitioning state, setting the time constant to be a first predetermined value.

4. The method of claim 3, further comprising, in response to determining that the eLSD is not in the transitioning state, setting the time constant to be a second predetermined value, wherein the first predetermined value is greater than the second predetermined value.

5. The method of claim 4, wherein the vehicle data includes a torque clutch capacity of the eLSD of a vehicle, a rotational speed of a left wheel of the vehicle, a rotational speed of a right wheel of the vehicle, an axle torque of the vehicle, a longitudinal velocity of the vehicle, a yaw rate of the vehicle, a normal force of the left wheel of the vehicle, and a normal force of the right wheel of the vehicle, and the method further comprises determining the preliminary eLSD clutch torque using the neural network and solely the torque clutch capacity of the eLSD of the vehicle, the rotational speed of the left wheel of the vehicle, the rotational speed of the right wheel of the vehicle, the axle torque of the vehicle, the longitudinal velocity of the vehicle, the yaw rate of the vehicle, the normal force of the left wheel of the vehicle, and the normal force of the right wheel of the vehicle.

6. The method of claim 5, wherein the clutch torque bounds of the eLSD includes a maximum bound and a minimum bound, and each of the maximum bound and the minimum bound is a function of the torque clutch capacity of the eLSD.

7. The method of claim 6, wherein the neural network is trained offline.

8. A vehicle, comprising:
a plurality of sensors each configured to generate vehicle data;
an electronic limited-slip differential (eLSD);
a controller in communication with the plurality of sensors and the eLSD, wherein the controller is programmed to:
receive the vehicle data in real-time, wherein the vehicle data includes a torque request;
determine a preliminary eLSD clutch torque using a neural network and the vehicle data;
determine clutch torque bounds of the eLSD using a physics-based model;
determine whether the preliminary eLSD clutch torque is outside the clutch torque bounds of the eLSD;
in response to determining that the preliminary eLSD clutch torque is outside the clutch torque bounds of the eLSD, adjust the preliminary eLSD clutch torque using the clutch torque bounds to determine a final clutch torque of the eLSD; and
command, in real-time, the eLSD to apply the final clutch torque to a clutch of the eLSD.

9. The vehicle of claim 8, wherein the controller is programmed to filter the final clutch torque using a digital filter, wherein the digital filter has a time constant.

10. The vehicle of claim 9, wherein the controller is programmed to determine whether the eLSD is in a transitioning state, wherein the eLSD is in the transitioning state when the eLSD is switching between a locked state and an unlocked state.

11. The vehicle of claim 10, wherein the controller is programmed to, in response to determining that the eLSD is in the transitioning state, setting the time constant to be a first predetermined value.

12. The vehicle of claim 11, wherein the controller is programmed to, in response to determining that the eLSD is not in the transitioning state, setting the time constant to be a second predetermined value, wherein the first predetermined value is greater than the second predetermined value.

13. The vehicle of claim 12, wherein the vehicle data includes a torque clutch capacity of the eLSD of the vehicle, a rotational speed of a left wheel of the vehicle, a rotational speed of a right wheel of the vehicle, an axle torque of the vehicle, a longitudinal velocity of the vehicle, a yaw rate of the vehicle, a normal force of the left wheel of the vehicle, and a normal force of the right wheel of the vehicle, and the controller is programmed to determine the preliminary eLSD clutch torque using the neural network and solely the torque clutch capacity of the eLSD of the vehicle, the rotational speed of the left wheel of the vehicle, the rotational speed of the right wheel of the vehicle, the axle torque of the vehicle, the longitudinal velocity of the vehicle, the yaw rate of the vehicle, the normal force of the left wheel of the vehicle, and the normal force of the right wheel of the vehicle.

14. The vehicle of claim 13, wherein the clutch torque bounds of the eLSD includes a maximum bound and a minimum bound, and each of the maximum bound and the minimum bound is a function of the torque clutch capacity of the eLSD.

15. A tangible, non-transitory, machine-readable medium, comprising machine-readable instructions, that when executed by a processor, cause the processor to
receive vehicle data in real-time, wherein the vehicle data includes a torque request;
determine a preliminary electronic limited-slip differential (eLSD) clutch torque of an eLSD using a neural network and the vehicle data;
determine clutch torque bounds of the eLSD using a physics-based model;
determine whether the preliminary eLSD clutch torque is outside the clutch torque bounds of the eLSD;
in response to determining that the preliminary eLSD clutch torque is outside the clutch torque bounds of the eLSD, adjust the preliminary eLSD clutch torque using the clutch torque bounds to determine a final clutch torque of the eLSD; and
command, in real-time, the eLSD to apply the final clutch torque to a clutch of the eLSD.

16. The tangible, non-transitory, machine-readable medium of claim 15, wherein the tangible, non-transitory, machine-readable medium further comprising machine-readable instructions, that when executed by the processor, causes the processor to filter the final clutch torque using a digital filter, wherein the digital filter has a time constant.

17. The tangible, non-transitory, machine-readable medium of claim 15, wherein the tangible, non-transitory, machine-readable medium further comprising machine-readable instructions, that when executed by the processor, causes the processor to determine whether the eLSD is in a transitioning state, wherein the eLSD is in the transitioning state when the eLSD is switching between a locked state and an unlocked state.

18. The tangible, non-transitory, machine-readable medium of claim 15, wherein the tangible, non-transitory, machine-readable medium further comprising machine-readable instructions, that when executed by the processor, causes the processor to, in response to determining that the eLSD is in a transitioning state, setting a time constant to be a first predetermined value.

19. The tangible, non-transitory, machine-readable medium of claim 18, wherein the tangible, non-transitory, machine-readable medium further comprising machine-readable instructions, that when executed by the processor, causes the processor to, in response to determining that the eLSD is not in the transitioning state, setting the time constant to be a second predetermined value, wherein the first predetermined value is greater than the second predetermined value.

20. The tangible, non-transitory, machine-readable medium of claim 15, wherein the vehicle data includes a torque clutch capacity of the eLSD of a vehicle, a rotational speed of a left wheel of the vehicle, a rotational speed of a right wheel of the vehicle, an axle torque of the vehicle, a longitudinal velocity of the vehicle, a yaw rate of the vehicle, a normal force of the left wheel of the vehicle, and a normal force of the right wheel of the vehicle, and the tangible, non-transitory, machine-readable medium further comprising machine-readable instructions, that when executed by the processor, causes the processor to determine the preliminary eLSD clutch torque using the neural network and solely the torque clutch capacity of the eLSD of the vehicle, the rotational speed of the left wheel of the vehicle, the rotational speed of the right wheel of the vehicle, the axle torque of the vehicle, the longitudinal velocity of the vehicle, the yaw rate of the vehicle, the normal force of the left wheel of the vehicle, and the normal force of the right wheel of the vehicle.

\* \* \* \* \*